United States Patent [19]

Hutter

[11] 3,936,132

[45] Feb. 3, 1976

[54] COAXIAL ELECTRICAL CONNECTOR

[75] Inventor: Harold Gregory Hutter, Brookfield, Conn.

[73] Assignee: Bunker Ramo Corporation, Oak Brook, Ill.

[22] Filed: Sept. 6, 1974

[21] Appl. No.: 503,948

Related U.S. Application Data

[63] Continuation of Ser. No. 327,868, Jan. 29, 1973, abandoned.

[52] U.S. Cl...... 339/130 C; 339/177 R; 339/218 M

[51] Int. Cl.$^2$...................... H01R 17/18; H02B 1/02

[58] Field of Search..................... 339/130, 177, 218

[56] References Cited

UNITED STATES PATENTS

| | | | |
|---|---|---|---|
| 2,881,479 | 4/1959 | Quackenbush | 339/218 M |
| 3,384,859 | 5/1968 | Loose | 339/177 R |
| 3,678,444 | 7/1972 | Stevens | 339/130 C |

FOREIGN PATENTS OR APPLICATIONS

| | | | |
|---|---|---|---|
| 1,162,441 | 2/1964 | Germany | 339/177 R |

*Primary Examiner*—Roy Lake
*Assistant Examiner*—Mark S. Bicks
*Attorney, Agent, or Firm*—Fred Fisher; F. M. Arbuckle

[57] ABSTRACT

This invention relates to a coaxial connector having an injection molded dielectric. The preferred embodiment of the invention is an improved insulated-from-ground panel connector having a onepiece molded body of an insulating material. The molded body has a rear portion shaped to coact with a suitable element for mounting the connector (for example a screw thread) and a forward portion shaped to form the mating face dielectric for the connector. An inner contact of a conductive material passes through the center of and is molded into the body. The connector also has an outer contact over which a forward portion of the insulating body is molded. The outer contact extends over and beyond the mating face dielectric and has a conductive lead molded in, extending through, and projecting from the rear of the body.

11 Claims, 3 Drawing Figures

COAXIAL ELECTRICAL CONNECTOR

This is a continuation of application Ser. No. 327,868, filed Jan. 29, 1973, now abandoned.

This invention relates to a coaxial electrical connector having an injection molded dielectric, and more particularly to an improved insulated-from-ground panel connector.

BACKGROUND OF THE INVENTION

In existing coaxial connectors adapted to be mounted on a panel, the conductive outer contact of the connector also serves as the connector body. Thus, when the contact is mounted in a panel of conductive material, the outer contact, being in electrical contact with the panel, is normally shorted to other contacts on the panel and to ground (or to whatever other potential the panel may be at). There are, however, applications where the shorting together and/or shorting to ground of the coaxial connector outer contacts cannot be tolerated.

For these applications, various techniques have been developed for insulating the connector outer conductor from the panel. The most common technique presently utilized to insulate the connector is to insert an insulating bushing between the connector body and the panel. This method also requires that an additional insulating washer be added between the lock washer or nut utilized for securing the connector in the panel and the panel. Another technique which may be utilized to isolate the panel connector from the panel (ground) is to mount an insulating sleeve over the connector body, the sleeve being the only element which makes contact with the panel, the locking nut, etc., when the connector is mounted in the panel.

While the techniques indicated above provide an insulated-from-ground bulkhead or panel connector, they suffer from a number of substantial shortcomings. First, when an insulated-from-ground connector is utilized in place of a standard panel connector, at least one, and sometimes two, extra parts are required. These additional parts must be handled and assembled on the connector when the connector is mounted. Thus, because of these extra parts, the insulated connector is significantly more expensive to manufacture and utilize than standard panel connectors.

Second, the extra washer, sleeve flanges, or other elements required for insulating the connector from the panel have a finite thickness which means that, for a given size connector, the maximum panel thickness which can be accommodated is reduced. Further, the addition of a bushing or sleeve on the connector increases the diameter required for the mounting hole. If standard size mounting holes have already been punched in the panel, this means that the panel will have to be repunched, or otherwise operated on to increase the hole diameters. The increased diameter required for the holes also reduces the connector density which may be accommodated on a panel. The reduction in panel thickness and in the amount of material between mounting openings combine to reduce the strength of the mounting panel.

In summary, it is seen that standard insulated-from-ground panel connectors are significantly more expensive to manufacture and utilize than standard panel connectors in that (1) they require additional parts; (2) the additional parts must be assembled, increasing the assembly cost; and (3) either standard size mounting openings must be enlarged, possibly requiring the purchase of special tooling to perform this function, or an inventory must be maintained of panels having two different size mounting holes.

From the above it is apparent that a requirement exists for a panel connector, the conductive body of which may be easily insulated from ground without resulting in any increase either in the size of the connector or in the cost of manufacturing and assembling it.

SUMMARY OF THE INVENTION

In accordance with the above this invention provides a coaxial electrical connector having a one-piece molded body of an insulating material. The body has a rear portion shaped to coact with a suitable element for mounting the connector and a forward portion shaped to form the mating face dielectric for the connector. An inner contact of a conductive material passes longitudinally through the center of and is molded into the body. The center contact has a portion extending from the rear of the body to which electrical connection may be made. The connector also has an outer contact over which a forward portion of the insulating body is molded. The outer contact extends over and beyond the mating face dielectric and has a conductive lead molded in, extending through, and projecting from the rear of the body. For a preferred embodiment, the body is injection molded of a thermoplastic material and has a flange for preventing contact of the outer contact with a panel in which the connector is mounted.

The foregoing and other objects, features, and advantages of the invention will be apparent from the following more particular description of a preferred embodiment of the invention as illustrated in the accompanying drawings.

DETAILED DESCRIPTION

Figure 1:
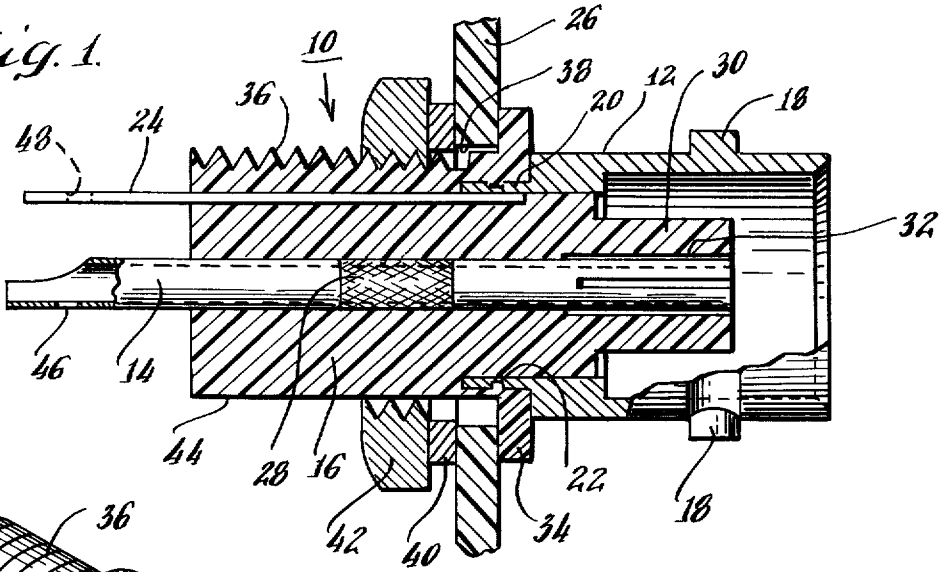
FIG. 1 is a sectional view of a panel connector utilizing the teachings of this invention.
Figure 2:
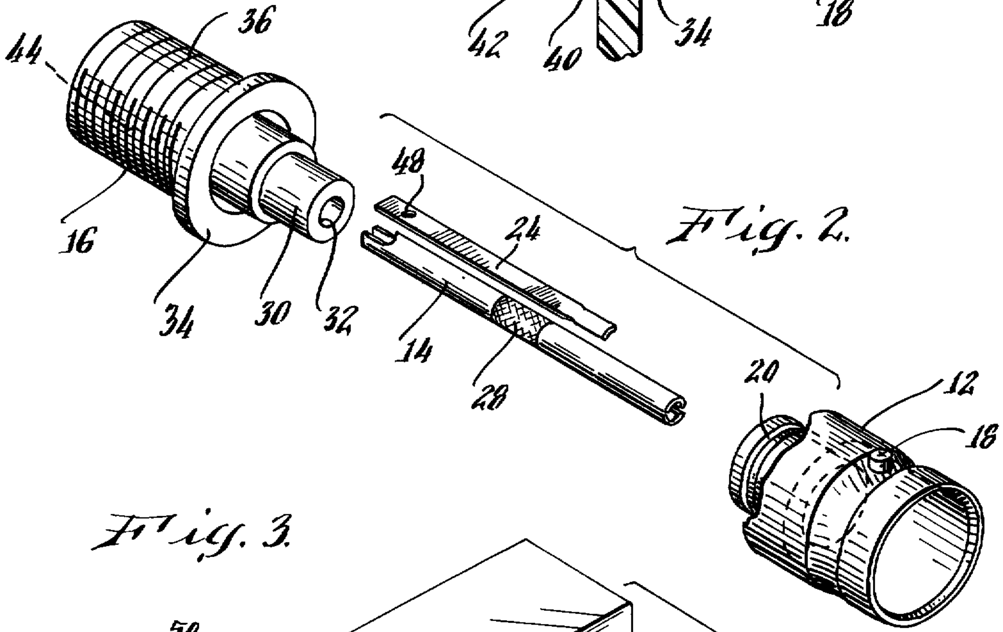
FIG. 2 is an exploded perspective view of the connector shown in FIG. 1.

Referring now to FIGS. 1 and 2, it is seen that the connector 10 of this invention has an outer annular contact body 12, a center coaxial contact 14, and a molded insulating body 16. Outer contact body 12 forms the body or outer shell for the forward portion of the connector, including the mating face area, and has a pair of radially outwardly projecting pins 18 located adjacent the front end of the contact to provide connecting means cooperating with cams in a mating connector (not shown) to secure connector 10 and the mating connector together. Behind the mating face area, body 12 has an annular section 20 of reduced outer diameter with a groove 22 being formed around the periphery of this section, which in combination with molded insulating body 16 provides means for locking the outer contact 12 on the body 16 and preventing or holding the outer contact against axial movement relative the body 16. Thus the forward portion of the body 16 is molded in continuous annular engagement with the internal surface and the external surface of the reduced outer diameter terminating annular rear section 20 of the body or contact 12. The insulating body 16 thus provides sufficient mechanical support for the contact 12 when mounted in a panel to securely hold the contact 12 and associated parts, when another connector and associated cable is attached thereto. Attached to an inner surface of portion 20 of body 12 is an extending conductive tab or lead 24. Lead 24 may be spot welded, soldered, or otherwise attached to body 12, or the body 12 and lead 24 may be diecast or otherwise formed as one piece. While lead 24 may be secured to either the inside of body 12 as shown in the figures or to the outside of the body, it is preferable to secure the lead to the inside as shown in the figures since this provides a greater separation between the lead and the outer surface of insulated body 16. This increases the insulation between the lead, and thus the outer conductor, and the panel 26 in which the connector 10 is mounted. The portion of lead 24 which is secured to outer contact body 12 may be rounded slightly to provide a larger area in contact with the body.

Center contact 14 is shown as being a female contact with a slotted opening in its forward face. A peripheral surface section 28 of the center contact is knurled for purposes to be described shortly.

As indicated previously, molded body 16 forms the rear body portion of connector 10. The forward portion of body 16 is extended into the annular contact or body 12 by means of a coaxial reduced diameter portion encircling the inner contact 14 and overlapped by the forward portion of contact 12 to further anchor or support contact 12 and to form the mating face dielectric 30 for the connector. A small space 32 is provided between the mating face dielectric 30 and the mating face end of contact 14 to permit the contact to expand when a male contact is inserted therein. The molded material of body 16 completely encloses portion 20 of body 12 and flows into groove 22 to form a ridge in groove 22, effectively locking the bodies 12 and 16 together. Body 16 has a flange 34 formed at the end of the portion thereof over portion 22 of body 12 which flange, as may be best seen in FIG. 1, butts against panel 26 when the connector is inserted in the panel, preventing contact between the panel and body 12. The screw thread 36 is formed on the outer surface of the rear portion of body 16. When the connector has been passed through an opening 38 in panel 26, a washer 40 is slipped over the rear portion of the connector and a nut 42 is then mounted on the rear portion and threaded on screw thread 36 to secure the connector on the panel. Screw threaded section 36 is flattened over a short segment 44. Hole 38 has a similar short flattened segment. This assures uniform orientation of the connectors inserted in panel 26 and prevents the connector from rotating in opening 38 during the mounting operation. The knurling 28 on contact 14 interacts with the material of body 16 to positively secure the contact in the insulating body. Center contact 14 and outer contact lead 24 extend from the rear of body 16 and have openings 46 and 48 respectively formed in them to permit electrical connection to be made to the contacts.

From the figures it is seen that a panel connector has been provided which has the same dimensions as a standard panel connector but which has only the material of insulated body 16 in contact with panel 26. With lead 24 being molded within body 16 or encircled by body 16 and in a radially spaced apart relationship to both inner contact 14 and the panel, isolated connections are independently established for body 12 and contact 14 through the panel and the connector is thus completely isolated electrically from panel 26, and thus from ground. Because insulating body 16 is of integrallly molded one-piece construction and forms part of the connector, no additional insulating parts are required for the connector, reducing both the cost of parts and assembly. The absence of extra parts also means that the thickness of panel 26 is limited only by the size of the connector. Standard size panel holes may also be utilized. Thus, an isolated-from-ground panel connector is provided without any of the increased costs and other problems previously associated with this type of connector.

Figure 3:
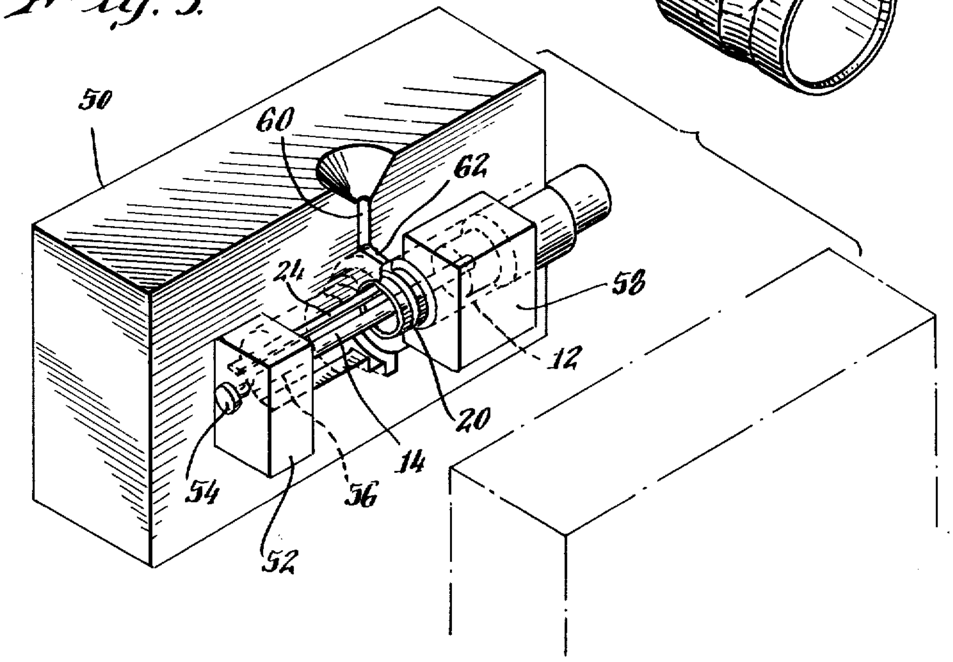
FIG. 3 is a perspective view of the mold and related equipment utilized for manufacturing the connector shown in FIG. 1.

It has, in fact, been found that by injection molding body 16 in a manner to be now described, the cost of connector 10 may be reduced significantly below that for convention panel connectors. Referring now to FIG. 3, a die 50 of a mold for forming connector 10 is shown. The die 50 may be formed of suitably coated cast iron or other conventional material. The die has a pinch-off 52 in which the projecting portions of center contact 14 and lead 24 are mounted. A variable stop 54 may be provided in the slot 56 for receiving center contact 14 to assure uniform and precise positioning of this component. A block 58 of suitable shape is inserted in the front portion of die 50 to mount outer contact 12 and assure the proper forming of mating face insulation section 30, including space 32. When contacts 12 and 14 and plug 58 have been properly positioned, a die (shown dotted) forming the other half of the mold is moved into and held position, and a suitable thermoplastic material is forced into the mold through channel 58 and orifice 60. The thermoplastic material utilized for a preferred embodiment of the invention is Noryl. Nylon might also be used. With Noryl as the thermoplastic material, the material may, for example, be introduced at a temperature between 480° and 570° F and at a pressure from 1000 to 1200 PSI. For the preferred embodiment, the point at which the thermoplastic material is introduced through orifice 62 is adjacent flange 34. This has been found to be the preferred spot of introduction. When a suitable quantity of thermoplastic material has been passed through orifice 62, the flow is stopped, the mold opened, and the finished connector removed. The molding operation described above is commonly referred to as an injection molding operation.

While the injection molding operation described above has been described for use with an insulated panel-mounted coaxial connector, it is apparent that this injection molding technique could also be utilized with other coaxial connectors. Further, while the rear body portion 36 has been shown as being screw threaded, it is apparent that this portion of body 16 could be shaped in any suitable manner to coact with a mating connector-mounting element. For example, in place of screw thread 36, a groove might be provided around the periphery of this portion of the body to receive a locking C-ring or snap ring. Further, since the thermoplastic material has a certain amount of resilience, the rear portion of body 16 might be shaped to be press-fitted into opening 38. Other suitable means of securing the connector 10 in panel 26 might also be utilized. It is also possible to vary the color of body 16 through well-known techniques involving additives in the thermoplastic mix to permit color coding of the connectors as to various sizes and types.

It should also be noted that since the cost of the connectors 10 may be significantly less than that of standard panel connectors, it may be desirable to use the connectors of this invention even in applications where a grounding of the outer conductor to the panel is desired (this also eliminates the need for keeping in inventory two different types of connectors). To ground connector 10 to panel 26, lead 24 is bent back and welded, soldered, or otherwise secured to the panel.

While the invention has been particularly shown and described above with reference to a preferred embodiment thereof, the foregoing and other changes in form and detail may be made therein by one skilled in the art without departing from the spirit and scope of the invention.

I claim:

1. A coaxial electrical panel connector adapted to be mounted in a panel having opposite surfaces with an opening communicating said opposite surfaces for supporting another coaxial connector from said panel and for enabling the extension of an electrical connection from the inner conductor and outer conductor of said other coaxial connector through said panel without electrical engagement with said panel, the improvement comprising:

an outer annular contact having a terminating annular rear end and a forward portion for engagement with the outer conductor of said other coaxial connector;

a conductive lead of substantially smaller cross section than said outer contact connected to said terminating rear end and extending rearwardly therefrom for passage through said opening;

an inner contact extending axially of said outer annular contact in radially spaced relationship to said outer contact and conductive lead with one end of said inner contact arranged for engagement with the inner conductor of said other coaxial connector and the other end of said inner contact arranged for passage through said opening;

a one piece body of insulating material passing through said opening and molded in encircling fixed relationship about both said inner contact and said conductive lead with said body having an integral outer forward portion in molded engagement with the outer periphery of said terminating rear end and an integral inner forward portion in molded engagement with the inner periphery of said terminating annular rear end to secure and support said outer contact from said panel with a dielectric mating face on said body extending into said outer contact and the forward portion of the outer contact extending forwardly of both the outer forward portion and the inner forward portion of said body, a continuous annular radial shoulder intermediate the ends of said body integrally interconnecting said outer annular forward portion and said inner annular forward portion, and a flange integrally formed on said body extending radially outwardly of said outer conductor for abutment with one surface of said panel to prevent engagement between said panel and outer contact.

2. A coaxial panel electrical connector adapted to be mounted in a panel having opposite surfaces with an opening communicating said opposite surfaces for supporting another coaxial connector from said panel and to enable the extension of a respective electrical connection from the inner conductor and outer conductor of said other coaxial connector through said panel opening without electrical engagement with said panel, the improvement comprising:

a one-piece integrally molded body of electrically insulating material, said body having a rear portion shaped and sized to pass through said opening in said panel and a forward inner annular portion on said molded body shaped to form a dielectric mating face with an outer annular forward portion spaced radially outwardly from said inner annular portion and integrally interconnected with said inner annular portion by a continuous annular shoulder intermediate the ends of said body;

an inner contact of a conductive material passing longitudinally through the center of said body from said forward inner annular portion and through said rear portion with said body fixedly molded about said inner contact, said inner contact having one end for engagement with the inner conductor of said other coaxial connector and another end extending from the rear portion of said body and passing through said opening with said rear portion;

an outer annular contact having a terminating annular rear end of reduced diameter located between the inner annular forward portion and outer annular forward portion of said one-piece integrally molded body with said inner annular portion and said outer annular portion molded in continuous fixed annular engagement with the internal surface and external surface respectively of said terminating annular rear end, said terminating annular rear end having a continuous rear end edge seated in continuous engagement with said continuous radial shoulder intermediate the ends of said body, said outer contact having a forward portion in overlapping relationship to said dielectric mating face and extending axially forwardly of said dielectric mating face and the inner and outer forward portions of said body with the forward portion of said outer contact having a rear radial shoulder adjacent said terminating rear end extending radially outwardly of said terminating rear end and in abutment with one axial end of said outer annular forward portion;

a conductive lead having a cross-sectional area less than said inner contact fixed in said one-piece body and electrically secured adjacent one end of said lead to said outer annular contact with said conductive lead extending through the rear portion of said body for passage through said opening in radially spaced apart relationship to said panel and to said inner contact and projecting from the rear portion of said body;

means integrally formed on the body in molding said body and on the outer contact locking the outer contact on the body against movement axially of said body;

means on the forward portion of said outer contact for securing said outer contact to said other coaxial connector with the outer contact engaged with the outer conductor of said other connector to extend a respective electrical connection from the outer conductor to said conductive lead extending through said panel opening and from the inner conductor engaged with the inner contact through said panel opening;

a radially outwardly extending flange integrally formed on said body at an axial position overlapping said terminating rear end for engaging one surface of said panel;

and means on said rear portion of said body for securing said body in said opening with said flange engaged against said one surface to support said panel connector and said other connector secured on the forward portion of said annular contact from said panel with said conductive lead and inner contact passing through said opening and spaced from said panel to pass through said panel without electrical engagement with said panel.

3. A connector as claimed in claim 1 wherein said lead is spot welded to said outer contact.

4. A connector as claimed in claim 1 wherein said lead is attached to an inner surface of said outer contact.

5. A connector as claimed in claim 1 wherein said lead is formed as an integral part of said outer contact.

6. A connector as claimed in claim 1 wherein said body is injection molded of a thermoplastic material.

7. A connector as claimed in claim 1 wherein said means for locking the outer contact on said body includes an annular groove in the external surface of said terminating rear end of said outer contact, and the outer annular portion of said molded body includes a ridge received in said groove for preventing relative axial movement between said contact and said body.

8. A connector as claimed in claim 7 wherein said radially outwardly extending flange integrally formed on said body is located in an axial position overlapping the reduced diameter portion of the outer contact to prevent physical and electrical contact between the outer contact and the panel.

9. A connector as claimed in claim 8 wherein said rear portion of said molded body includes an outer surface having a screw thread.

10. A connector as claimed in claim 9 wherein said outer surface of said rear portion of said molded body includes a flat section axially coincident with said screw thread, whereby a predetermined angular orientation is established between said panel and said connector.

11. A connector as claimed in claim 10 wherein said inner contact has a knurled surface which is adapted to coact with the molded body to retain the contact in the body.

* * * * *